United States Patent
Jin et al.

(10) Patent No.: US 11,042,410 B2
(45) Date of Patent: Jun. 22, 2021

(54) RESOURCE MANAGEMENT OF RESOURCE-CONTROLLED SYSTEM

(71) Applicant: Nokia Solutions and Networks Oy, Espoo (FI)

(72) Inventors: Yue Jin, Boulogne-Billancourt (FR); Dimitre Kostadinov, Paris (FR); Makram Bouzid, Orsay (FR); Armen Aghasaryan, Savigny sur Orge (FR)

(73) Assignee: Nokia Solutions and Networks Oy, Espoo (FI)

( * ) Notice: Subject to any disclaimer, the term of this patent is extended or adjusted under 35 U.S.C. 154(b) by 51 days.

(21) Appl. No.: 16/380,311

(22) Filed: Apr. 10, 2019

(65) Prior Publication Data

US 2019/0317814 A1    Oct. 17, 2019

(30) Foreign Application Priority Data

Apr. 17, 2018   (EP) .................................. 18305473

(51) Int. Cl.
  *G06F 9/50* (2006.01)
  *G06N 20/00* (2019.01)
  *G06F 9/455* (2018.01)

(52) U.S. Cl.
  CPC ........ *G06F 9/5011* (2013.01); *G06F 9/45558* (2013.01); *G06N 20/00* (2019.01); *G06F 2009/45579* (2013.01)

(58) Field of Classification Search
  CPC ............... G06F 9/5011; G06F 9/45558; G06F 2009/45579; G06N 20/00

(Continued)

(56) References Cited

U.S. PATENT DOCUMENTS 4,727,487 A * 2/1988 Masui ................. G06F 9/50
                                                              706/52
6,665,651 B2  12/2003 Young et al.
(Continued)

FOREIGN PATENT DOCUMENTS

EP          3316140 A1     5/2018

OTHER PUBLICATIONS

Guazzone, Marco, Cosimo Anglano, and Massimo Canonico. "Energy-efficient resource management for cloud computing infrastructures." 2011 IEEE Third International Conference on Cloud Computing Technology and Science. IEEE, 2011 .pp. 424-431 (Year: 2011).*

(Continued)

*Primary Examiner* — Satish Rampuria
(74) *Attorney, Agent, or Firm* — Mintz Levin Cohn Ferris Glovsky and Popeo, P.C.

(57) ABSTRACT

An apparatus (5) manages resources of a resource-controlled system (1), e.g. data processing resources in a data processing system. The resource-controlled system (1) has resource-elasticity, namely it may operate in several states involving different amounts of system resources. The resource management apparatus (5) may select a modification action having at least one resource variation parameter. The resource variation parameter represents a resource quantity to be added or removed in the resource-controlled system (1). The apparatus (5) may update a value function of an adaptive learning agent (7) as a function of performance metrics (4) measured after the resources of the resource-controlled system have been modified by effecting the modification action. Responsive to a safety criterion not being fulfilled, a finer resource variation parameter may be substituted.

17 Claims, 4 Drawing Sheets

(58) Field of Classification Search
USPC .................................................. 718/1–108
See application file for complete search history.

(56) References Cited

U.S. PATENT DOCUMENTS

| | | | |
|---|---|---|---|
| 8,793,381 | B2 | 7/2014 | Baughman et al. |
| 9,923,785 | B1 | 3/2018 | Li et al. |
| 10,417,051 | B2* | 9/2019 | Behrendt .................. G06F 9/52 |
| 2004/0073764 | A1 | 4/2004 | Andreasson |
| 2010/0241243 | A1 | 9/2010 | Hans et al. |
| 2013/0346614 | A1* | 12/2013 | Baughman ............ G06F 9/5083 709/226 |
| 2014/0089917 | A1 | 3/2014 | Attalla et al. |
| 2015/0281113 | A1* | 10/2015 | Siciliano ............. H04L 43/0817 709/226 |
| 2017/0279736 | A1* | 9/2017 | Pitio ...................... G06Q 40/04 |

OTHER PUBLICATIONS

Li, Qiang, et al. "Adaptive management of virtualized resources in cloud computing using feedback control." 2009 First International Conference on Information Science and Engineering. IEEE, 2009. pp. 99-102 (Year: 2009).*

Van, Hien Nguyen, Frederic Dang Tran, and Jean-Marc Menaud. "Autonomic virtual resource management for service hosting platforms." 2009 ICSE Workshop on Software Engineering Challenges of Cloud Computing. IEEE, 2009.pp. 1-8 (Year: 2009).*

Banga, Gaurav, Peter Druschel, and Jeffrey C. Mogul. "Resource containers: A new facility for resource management in server systems." OSDI. vol. 99. 1999.pp. 45-58 (Year: 1999).*

Waldspurger, Carl A. "Memory resource management in VMware ESX server." ACM SIGOPS Operating Systems Review 36.SI (2002): pp. 181-194. (Year: 2002).*

Foster, Ian, et al. "A distributed resource management architecture that supports advance reservations and co-allocation." 1999 Seventh International Workshop on Quality of Service. IWQoS'99.(Cat. No. 98EX354). IEEE, 1999.pp. 27-36 (Year: 1999).*

McFarlane, "A Survey of Exploration Strategies in Reinforcement Learning", Semantic Scholar, 2003, pp. 1-10.

Tijsma et al., "Comparing Exploration Strategies for Q-learning in Random Stochastic Mazes", 2016 IEEE Symposium Series on Computational Intelligence (SSCI), Dec. 6-9, 2016, 7 pages.

Garcia et al., "Safe Exploration of State and Action Spaces in Reinforcement Learning", Journal of Artificial Intelligence Research, vol. 45, 2012, pp. 515-564.

Lee et al., "Micro-objective Learning : Accelerating Deep Reinforcement Learning Through the Discovery of continuous Subgoals", arXiv, Mar. 11, 2017, 9 pages.

Extended European Search Report received for corresponding European Patent Application No. 18305473.3, dated Oct. 29, 2018, 8 pages.

Office action received for corresponding European Patent Application No. 18305473.3, dated Aug. 13, 2020, 8 pages.

Office action received for corresponding European Patent Application No. 18305473.3, dated Feb. 24, 2021, 10 pages.

Zhao, Jie-Yu, "Self-modifying reinforcement learning." Proceedings of the First International Conference on Machine Learning and Cybernetics, Beijing, China, Nov. 4-5, 2002, IEEE, vol. 4, pp. 2146-2151, XP010629953, 10 pages.

* cited by examiner

RESOURCE MANAGEMENT OF RESOURCE-CONTROLLED SYSTEM

FIELD

The disclosure relates to methods and apparatuses for managing resources of a resource-controlled system, and in particular to methods and apparatuses that employ adaptive learning techniques for managing resources.

The disclosure relates to resource management in all sorts of resource-controlled system, including data processing systems and others.

BACKGROUND

Growing complexity in the hyper-connected society is a major challenge for system management and control. The digital system of the future will provide global connectivity to billions of Internet-of-Things (IoT) devices and end-users, and will rely on cloud-enabled communication networks. Traditional approaches to resource management will be increasingly defied due to the emergence of these complex dynamically evolving networks.

SUMMARY

In some example embodiments the disclosure provides an apparatus for managing resources of a resource-controlled system, e.g. data processing resources in a data processing system.

The resource management apparatus may comprise at least one processor and at least one memory including computer program code. The at least one memory and the computer program code may be configured to, with the at least one processor, cause the apparatus to select a modification action having at least one resource variation parameter. The resource variation parameter represents a resource quantity to be added or removed in the resource-controlled system.

The at least one memory and the computer program code may be configured to, with the at least one processor, cause the apparatus to update a value function of an adaptive learning agent as a function of one or more performance metrics measured after the resources of the resource-controlled system have been modified by effecting the modification action.

The one or more performance metrics relate to the resource-controlled system. The value function represents a desirability of the resource-controlled system as a function of one or more system states.

In some example embodiments, selecting the modification action may further comprise selecting a first resource variation parameter, assessing whether the modification action having the first resource variation parameter fulfills at least one safety criterion, and substituting the first resource variation parameter by a second resource variation parameter having a finer scale resource quantity than the first resource variation parameter responsive to the safety criterion not being fulfilled.

Such modification action having a second resource variation parameter having a finer scale resource quantity than the first resource variation parameter may be referred to as micro-modification action. Since the micro-modification action involves smaller quantitative resource variation, e.g. data processing resources in a data processing system, it may be selected so that stability of the resource-controlled system is not jeopardized.

In some example embodiments, such apparatus may comprise one or more of the features below.

The resource-controlled system has resource-elasticity, namely it may operate in several states involving different amounts of system resources, e.g. data processing resources in a data processing system. The resource-controlled system has an inherent property that causal control may be exerted over the amount of resources that it consumes or involves in a given state.

The at least one memory and the computer program code may be further configured to, with the at least one processor, cause the apparatus to modify the resources of the resource-controlled system by effecting the modification action prior to updating the value function of the adaptive learning agent.

In an example embodiment, the value function is defined for system states resulting from macro-modification actions. A macro-modification action has at least one resource variation parameter selected in a predefined set of values, e.g. equal to an integer multiple of a predefined resource increment. The predefined resource increment may be imposed by technical considerations, e.g. granularity of resource variation provided by a control interface or control technique.

The at least one memory and the computer program code may be further configured to, with the at least one processor, cause the apparatus to determine a macro-modification action adjacent to the modification action, i.e. micro-modification action, by rounding up or rounding down the second resource variation parameter to an integer multiple of the predefined resource increment or to some value selected within the predefined set of values. Hence, the value function of the adaptive learning agent may be updated for a system state which would have resulted from effecting the macro-modification action adjacent to the micro-modification action, instead of effecting the micro-modification action.

Thanks to these features, the adaptive learning agent may be updated as if the system state resulting from the macro-modification had been visited, while avoiding visiting that state itself. A system state resulting from the micro-modification action is visited instead, which fulfils a predefined safety criterion.

For that purpose, the at least one memory and the computer program code may be further configured to, with the at least one processor, cause the apparatus at least to determine a reward function value for the modification action as a function of the one or more performance metrics measured after the resources of the resource-controlled system have been modified by effecting the modification action, and to determine a reward function value for the macro-modification action by extrapolating a reward function. Reward function extrapolation may be achieved in different ways, e.g. by linear or quadratic extrapolation.

The at least one memory and the computer program code may be further configured to, with the at least one processor, cause the apparatus to modify the resources of the resource-controlled system by reversing the modification action, e.g. after the performance metrics have been measured.

Thanks to these features, a system state resulting from the (micro-) modification action is visited temporarily and may be ignored by the adaptive learning agent, which may record system states resulting from the macro-modification actions.

The safety criterion or criteria are intended to define states that should not be blindly visited. A safety criterion may be defined in different ways, e.g. as a function of statistics of the value function employed by the adaptive learning agent or as a function of absolute or relative resource thresholds.

In example embodiments the safety criterion represents whether the value function is trustworthy. Hence, conditions in which a modification action is considered safe may include two cumulative conditions: (i) the modification action has provided a positive action-value which is reflected by the value function and (ii) its action-value is trustworthy.

In example embodiments the assessment of whether the safety criterion is fulfilled involves comparing a variance of the value function to a predefined threshold value, and/or determining a number of prior occurrences of the modification action, and/or comparing the resource variation parameter to a predefined threshold value.

The first resource variation parameter may be randomly selected, e.g. when the adaptive learning agent decides to take an exploration action. The first resource variation parameter may be selected to maximize the value function in a current system state, e.g. when the adaptive learning agent decides to take an exploitation action.

In some example embodiments, a modification action may involve one or more resources and one or more resource variation parameters associated to those resources. For systems that consume resources of different types, the modification action selection may further comprise selecting a resource type in a set of resource types.

In an example embodiment, the resource-controlled system comprises a data processing system. For a data processing system, the resource variation parameters may relates to a number of different resource types, e.g. Random-Access Memory (RAM) capacity, Central Processing Unit (CPU) processing power, CPU bandwidth, number of processor-cores, number of virtual machines, disk input/output (I/O) bandwidth, network I/O bandwidth and others.

The resource variation parameter represents a resource quantity, i.e. includes a quantitative representation of the resources to be varied. The resource quantity may be expressed in a variety of units of measurement. In an example embodiment, the resource variation parameter includes at least one number that refers explicitly or implicitly to at least one unit of measurement. The units of measurement may include standard units or proprietary units. The units of measurement may include absolute units or relative units.

Standard units of measurement applicable to RAM capacity are e.g. bytes, kb, Mb, Gb, etc. Standard units of measurement applicable to CPU bandwidth are e.g. bit/s, Kbit/s, Mbit/s, Gbit/s, etc. Standard units of measurement applicable to CPU processing power are e.g. floating point operations per second (FLOPS, i.e. an absolute unit) or CPU usage (percentage, i.e. a relative unit).

The second resource variation parameter having a finer scale resource quantity represents a finer or smaller quantity of the resources than the first resource variation parameter. In an example embodiment, the second resource variation parameter may include a smaller number than the number included in the first resource variation parameter. In an example embodiment, the second resource variation parameter may refer explicitly or implicitly to a finer unit of measurement than the first resource variation parameter.

In an example embodiment, the resource-controlled system may comprise a virtualized data processing system, e.g. such as a cloud computing system with virtualized resources. The at least one memory and the computer program code may be further configured to, with the at least one processor, cause the apparatus at least to send resource modification instructions to a virtualization layer of the data processing system to effect modification actions.

In some example embodiments, the disclosure also provides a computer-implemented method for managing resources of a resource-controlled system, comprising:
selecting a modification action having at least one resource variation parameter, wherein the resource variation parameter represents a resource quantity to be added or removed in the resource-controlled system,
updating a value function of an adaptive learning agent as a function of one or more performance metrics measured after the resources of the resource-controlled system have been modified by effecting the modification action, wherein the one or more performance metrics relate to the resource-controlled system, wherein the value function represents a desirability of the resource-controlled system as a function of one or more system states,
wherein selecting the modification action further comprises:
selecting a first resource variation parameter, and
assessing whether the modification action having the first resource variation parameter fulfills at least one safety criterion, and
substituting the first resource variation parameter by a second resource variation parameter having a finer scale resource quantity than the first resource variation parameter responsive to the safety criterion not being fulfilled.

In some example embodiments, such a method may further comprise one or more of the features below.

In an example embodiment, the method further comprises determining a macro-modification action adjacent to the modification action by rounding the second resource variation parameter to an adjacent integer multiple of the predefined resource increment, wherein the value function of the adaptive learning agent is updated for a system state which would have resulted from the macro-modification action adjacent to the modification action.

In an example embodiment, the method further comprises modifying the resources of the resource-controlled system by reversing the modification action.

In an example embodiment, the method further comprises determining a reward function value for the modification action as a function of the performance metrics measured after the resources of the resource-controlled system have been modified by effecting the modification action, and determining a reward function value for the macro-modification action by extrapolating a reward function.

In an example embodiment, the method further comprises comparing a variance of the value function to a predefined threshold value and/or comparing the resource variation parameter to a predefined threshold value and/or determining a number of prior occurrences of the modification action to assess whether the safety criterion is fulfilled.

In an example embodiment, the method further comprises selecting a resource type in a set of resource types.

In an example embodiment, the method further comprises modifying the resources of the resource-controlled system by effecting the modification action.

In an example embodiment, the method further comprises sending resource modification instructions to a virtualization layer of the data processing system to effect the modification action.

In example embodiments, the disclosure also provides a computer program comprising executable code that causes a computer to perform the steps of such method when executed.

In some example embodiments, the disclosure also provides an apparatus comprising:

adaptive learning circuitry configured to select a modification action having at least one resource variation parameter and select a first resource variation parameter, estimation circuitry configured to update a value function of the adaptive learning circuitry as a function of one or more performance metrics measured after the resources of the resource-controlled system have been modified by effecting the modification action, and attenuation circuitry configured to perform:

assessing whether the modification action having the first resource variation parameter fulfills at least one safety criterion, and substituting the first resource variation parameter by a second resource variation parameter having a finer scale resource quantity than the first resource variation parameter responsive to the safety criterion not being fulfilled.

In an example embodiment, the apparatus further comprises resource control circuitry configured to modify the resources of the resource-controlled system by effecting the modification action prior to updating the value function of the adaptive learning agent.

In an example embodiment, the estimation circuitry is further configured to determine a macro-modification action adjacent to the modification action by rounding the second resource variation parameter to an integer multiple of the predefined resource increment, and the resource control circuitry is further configured to modify the resources of the resource-controlled system by reversing the modification action.

In an example embodiment, the apparatus further comprises extrapolation circuitry configured to determine a reward function value for the macro-modification action by extrapolating a reward function.

In an example embodiment, the attenuation circuitry is further configured to perform at least one of:

comparing a variance of the value function to a predefined threshold value to assess whether the safety criterion is fulfilled;

comparing the resource variation parameter to a predefined threshold value to assess whether the safety criterion is fulfilled; and determining a number of prior occurrences of the modification action to assess whether the safety criterion is fulfilled.

In some example embodiments, the disclosure also provides an apparatus, e.g. an apparatus for managing resources of a resource-controlled system, comprising: means for selecting a modification action having at least one resource variation parameter, and means for updating a value function of an adaptive learning agent as a function of one or more performance metrics measured after the resources of the resource-controlled system have been modified by effecting the modification action.

In some example embodiments the means for selecting the modification action further comprise:

means for selecting a first resource variation parameter, and
means for assessing whether the modification action having the first resource variation parameter fulfills at least one safety criterion, and means for substituting the first resource variation parameter by a second resource variation parameter having a finer scale resource quantity than the first resource variation parameter responsive to the safety criterion not being fulfilled.

In some example embodiments, the disclosure also provides an apparatus comprising means for performing:

selecting a modification action having at least one resource variation parameter, and updating a value function of an adaptive learning agent as a function of one or more performance metrics measured after the resources of a resource-controlled system have been modified by effecting the modification action.

In some example embodiments the means for selecting the modification action further comprise means for performing:

selecting a first resource variation parameter, and
assessing whether the modification action having the first resource variation parameter fulfills at least one safety criterion, and substituting the first resource variation parameter by a second resource variation parameter having a finer scale resource quantity than the first resource variation parameter responsive to the safety criterion not being fulfilled.

In some example embodiments, the means are further configured to perform:

modifying the resources of the resource-controlled system by effecting the modification action prior to updating the value function of the adaptive learning agent.

In some example embodiments, the means are further configured to perform:

determining a macro-modification action adjacent to the modification action by rounding the second resource variation parameter to an integer multiple of the predefined resource increment, wherein the value function of the adaptive learning agent is updated for a system state which would have resulted from the macro-modification action adjacent to the modification action, and modifying the resources of the resource-controlled system by reversing the modification action.

In some example embodiments, the means are further configured to perform:

determining a reward function value for the modification action as a function of the performance metrics measured after the resources of the resource-controlled system have been modified by effecting the modification action, and determining a reward function value for the macro-modification action by extrapolating a reward function.

In some example embodiments, the means are further configured to perform:

comparing a variance of the value function to a predefined threshold value to assess whether the safety criterion is fulfilled.

In some example embodiments, the means are further configured to perform:

comparing the resource variation parameter to a predefined threshold value to assess whether the safety criterion is fulfilled.

In some example embodiments, the means are further configured to perform:

determining a number of prior occurrences of the modification action to assess whether the safety criterion is fulfilled.

In some example embodiments, the means are further configured to perform:

sending one or more resource modification instructions to a virtualization layer of the data processing system to effect the modification action.

In some example embodiments, the means in the apparatus further comprises;

at least one processor; and at least one memory including computer program code, the at least one memory and computer program code configured to, with the at least one processor, cause the performance of the apparatus.

In an example embodiment, an apparatus for managing resources of a resource-controlled system, the apparatus comprising at least one processor and at least one memory including computer program code;

the at least one memory and the computer program code configured to, with the at least one processor, cause the apparatus at least to perform:

select a modification action having at least one resource variation parameter, wherein the resource variation parameter represents a resource quantity to be added or removed in the resource-controlled system, update a value function of an adaptive learning agent as a function of one or more performance metrics measured after the resources of the resource-controlled system have been modified by effecting the modification action, wherein the one or more performance metrics relate to the resource-controlled system, wherein the value function represents a desirability of the resource-controlled system as a function of one or more system states, wherein the selection of the modification action further comprises:

select a first resource variation parameter, and assess whether the modification action having the first resource variation parameter fulfills at least one safety criterion, and substitute the first resource variation parameter by a second resource variation parameter having a finer scale resource quantity than the first resource variation parameter responsive to the safety criterion not being fulfilled.

In an example embodiment, a non-transitory computer readable medium comprising program instructions for causing an apparatus to perform at least the following: selecting a modification action having at least one resource variation parameter, wherein the resource variation parameter represents a resource quantity to be added or removed in a resource-controlled system, updating a value function of an adaptive learning agent as a function of one or more performance metrics measured after the resources of the resource-controlled system have been modified by effecting the modification action, wherein the one or more performance metrics relate to the resource-controlled system, wherein the value function represents a desirability of the resource-controlled system as a function of one or more system states, wherein selecting the modification action further comprises: selecting a first resource variation parameter, and assessing whether the modification action having the first resource variation parameter fulfills at least one safety criterion, and substituting the first resource variation parameter by a second resource variation parameter having a finer scale resource quantity than the first resource variation parameter responsive to the safety criterion not being fulfilled.

BRIEF DESCRIPTION OF THE DRAWINGS

These and other aspects of the invention will be apparent from and elucidated with reference to example embodiments described hereinafter, by way of example, with reference to the drawings.

DETAILED DESCRIPTION OF THE EMBODIMENTS

One of the challenges a continuous learning approach faces concerns the detrimental random exploration of the state space, especially due to uncertainty in an initial state or cold start phase. The actions taken by the adaptive learning agent before learning their efficiency could bring the system in undesirable states, violate its security or safety requirements, or even provoke a system crash. The present disclosure relates to methods that avoid blindly visiting potentially dangerous or unstable states, while still allowing the adaptive learning agent to explore the state space in order to increase its efficiency. Aspects of the disclosure aim to predict the effect of visiting unexplored states involving some risk and to allow visiting those states if the prediction provides an expectation for a good efficiency, while avoiding bringing the system into these states otherwise.

An embodiment provides a micro-modification action based resource management apparatus for safe exploration of system state space for machine learning such as reinforcement learning. The managed system has elasticity capability, e.g. the ability of a cloud entity to be flexible with the scale of the case size.

The resource management apparatus may comprise one or more monitoring meters to acquire monitored metrics for tracking conditions of a managed system and gradually learns about the managed system and proper actions to take for given system conditions. The resource management apparatus may take a macro-modification action when knowledge of the best action is trustworthy i.e. it is safe for taking the macro-modification action. The resource management apparatus may adjust one or more resource variations, e.g. transforming one or more macro-modification actions into one or more micro-modification actions, i.e. by adjusting one or more resource variations on a finer scale by an attenuation manager. The one or more micro-modification actions may be taken during a learning process for safer exploration when the one or more macro-modification actions are not safe. Trustworthiness can be computed through statistical principles (e.g. based on the standard deviation of Q-values (Q(s, ai) for actions ai) in reinforcement learning.

The apparatus may store a set of parameters in a safety policies module, allowing formulating a micro-modification action from a given macro-modification action in a current state. The safety policies provide a set of rules that govern the decision of the attenuation manager. The attenuation manager may send definition of the micro-modification action to a resource control interface which executes the micro-modification action on the managed system.

An extrapolator module may update a coarse system model, e.g. a macro-modification actions-based learning model (e.g. Q-values) by observing effects of executed one or more micro-modification actions.

Figure 1:
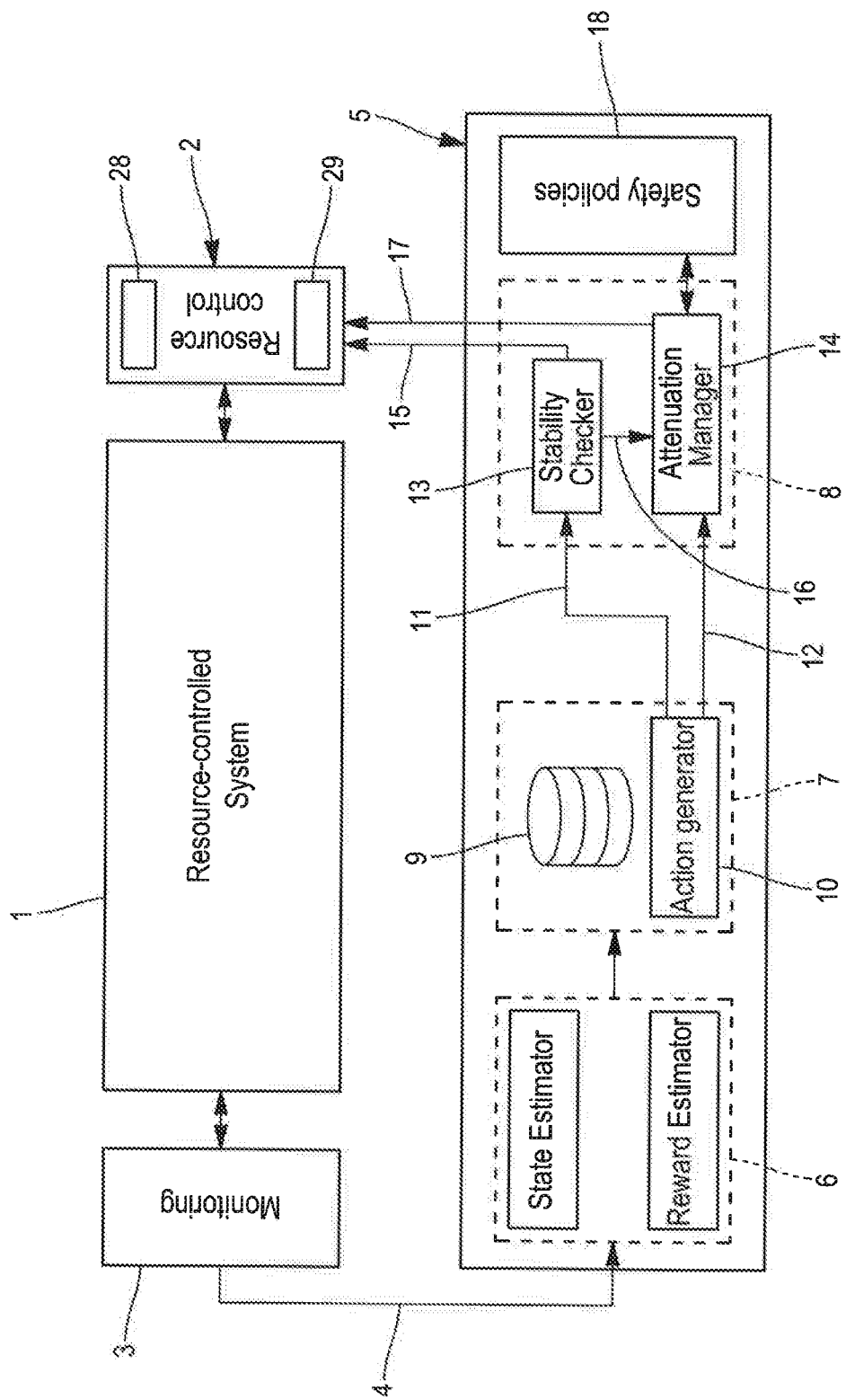
FIG. 1 is a functional representation of a resource-controlled system in interaction with a resource management apparatus in accordance with a first example embodiment.

As depicted in FIG. 1, in accordance with example embodiments of methods and apparatuses to sample a system-state space of a resource-controlled system 1 in a safe manner during adaptive learning will be described below. The resource-controlled system or apparatus 1 may be a data processing system, e.g. cloud computing environment or service, that hosts one or more applications circuitries, computers, memory units and/or servers. In another example embodiment, the resource-controlled system 1 may be a wireless communication system, e.g. a wireless telecommunication system, that hosts one or more applications, circuitries, computers, memory units, servers, transmitters and/or receivers. The resource-controlled system 1 has elasticity capability and has resource control capability 2, e.g. a resource control interface, application, circuitry, computer, memory unit, apparatus and/or server, that makes it possible to dynamically adjust the resource capacities provided to the one or more applications, circuitries, computers, memory units and/or servers. The one or more applications, circuitries, computers, memory units and/or servers may have varying demands and resource capacities may be dynamically adjusted according to the demands for the benefit of efficiency and/or value for money, e.g. when the cloud computing capacity is rented by the end-user on a fee-for-service basis.

The resource-controlled system 1 has monitoring capability 3, e.g. a monitoring application, circuitry, computer, apparatus and/or server, that produces performance metrics 4 that reflect the conditions of the resource-controlled system 1 and/or the one or more applications, circuitries, computers, memory units and/or servers. The monitoring capability 3 may include one or more sensors or sensing means of any kind, such as one or more applications, circuitries and/or computers, suitable for detecting performance conditions of the resource-controlled system 1.

A resource management apparatus 5 interacts with the resource-controlled system 1 to cause resource modification actions to be executed over time as a function of the performance metrics 4. For that purpose, the resource management apparatus or system 5 comprises an estimation circuitry 6, an adaptive learning circuitry 7 and an attenuation circuitry 8. Alternatively or additionally, the resource management apparatus 5 comprises an estimation application, agent, computer and/or server 6, and adaptive learning application, agent, computer and/or server 7, and an attenuation application, agent, computer and/or server 8.

The resource management apparatus 5 may implement an adaptive learning method that takes the performance metrics 4 and gradually learns about the resource-controlled system 1 and one or more resource modification actions to be taken for a given system conditions. The adaptive learning method converts and analyses the performance metrics 4, updates its understanding of the resource-controlled system 1 and decides the resource modification actions to take under the current condition in an iterative fashion.

Figure 2:
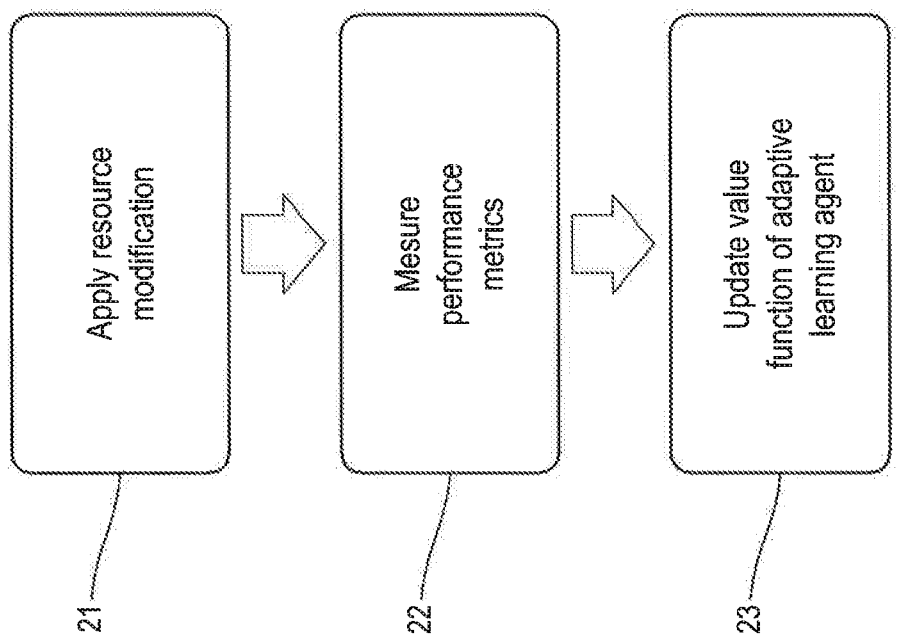
FIG. 2 is a flow chart of an iterative process that may be executed by the resource management apparatus.

As depicted in FIG. 2, such adaptive learning method may comprise the following iterative steps:
21: Applying resource modification
22: Measuring performance metrics
23: Updating value function of adaptive learning agent and/or circuitry The one or more resource modification actions may comprise adjusting capacities, for example of one or more applications, circuitries, processors, computers, memory units and/or servers, in predefined increments that may involve a substantial quantity because of various technical and business constraints. For instance, the one or more resource modification actions that can be taken in a cloud computing system comprise adding or removing an integer number of virtual machines. Such resource modification actions may be referred to as macro-modification actions. Incorrect macro-modification actions such as reducing resources in a heavily loaded data processing system 1 can cause severe system performance degradation or even make the data processing system fail.

In this case, any such randomly triggered macro-modification action can potentially bring the resource-controlled system 1 into an undesirable or unsafe state which should be avoided.

To alleviate such risk, the resource management apparatus 5 may implement a selection method for selecting or defining one or more resource modification actions in a manner that makes the learning process safer. Such a method may adjust the resource capacities on a finer scale than a macro-modification action scale as a function of safety criteria.

Figure 3:
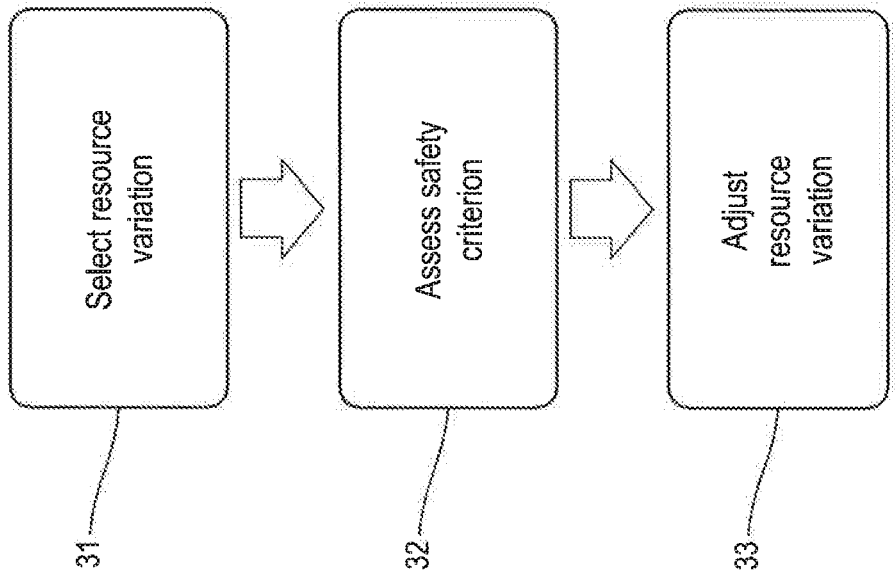
FIG. 3 is a flow chart of a method that may be executed by the resource management apparatus of FIG. 1 to select a modification action in accordance with another example embodiment.

As depicted in FIG. 3, such selection method may comprise the following steps, which may be iterative:
31: selecting a resource variation
32: assessing a safety criterion as a function of the resource variation
33: adjusting the resource variation, e.g. by reducing or increasing a scale of the resource variation, if or as long as the safety criterion is not fulfilled.

As an illustration, in a cloud computing system, the method may elect to add or remove a fraction of a predefined virtual machine rather than selecting the above-described macro-modification actions. Such actions may be referred to as micro-modification actions. In an embodiment, the selection method checks if it is safe to take the macro-modification action and selects a micro-modification action if effecting the macro-modification is not safe.

In the first example embodiment depicted in FIG. 1, after the resource-controlled system 1 produces new performance metrics 4 after effecting the micro-modification action, the resource management apparatus 5 updates the value function of the adaptive learning circuitry 7 for the a system state resulting from the micro-modification action.

Figure 4:
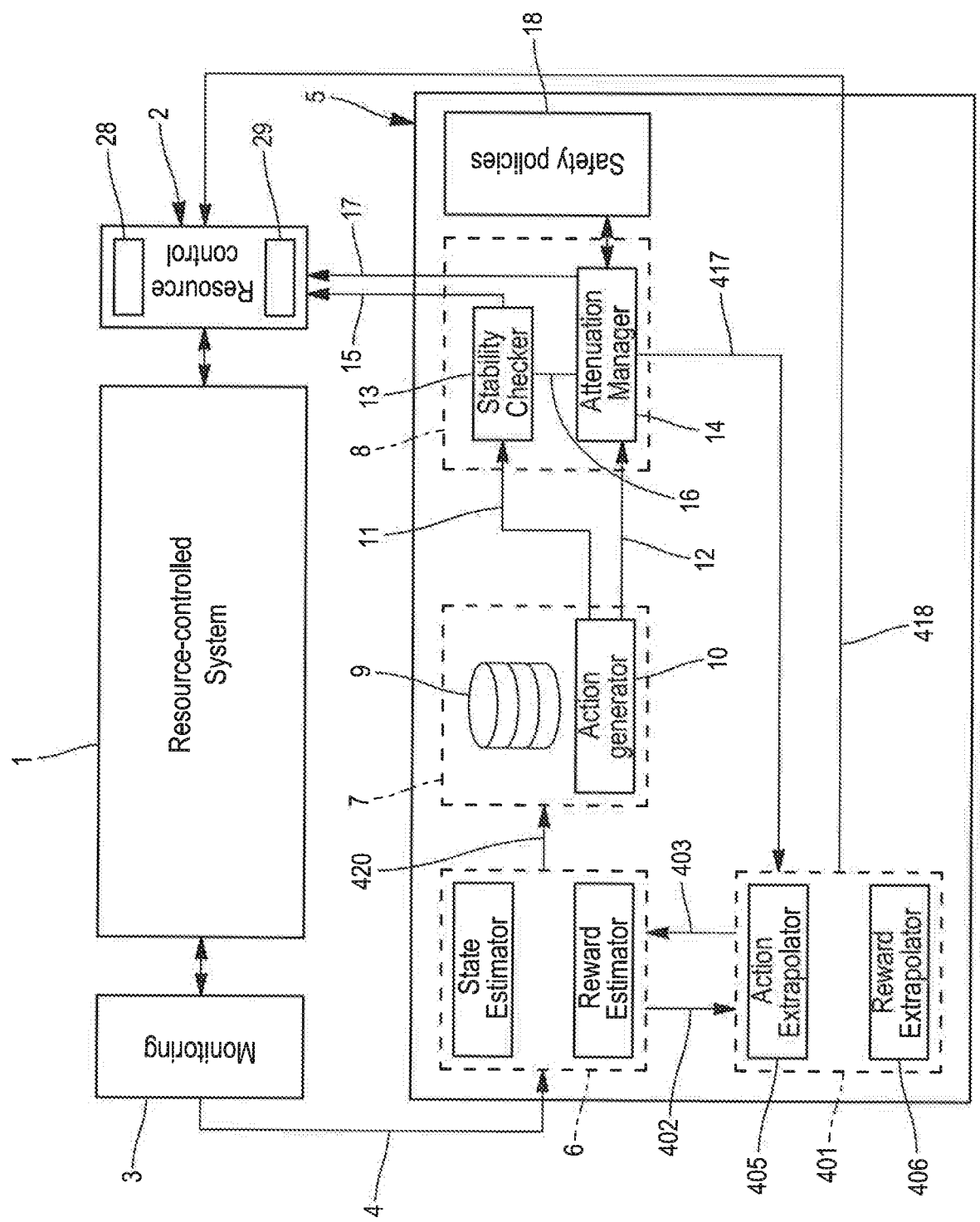
FIG. 4 is a functional representation of a resource-controlled system in interaction with a resource management apparatus in accordance with a second example embodiment.

In the second example embodiment depicted in FIG. 4, after the resource-controlled system 1 produces new performance metrics 4 after effecting the micro-modification action, the resource management apparatus 5 may determine extrapolations and update the value function of the adaptive learning circuitry 7 for an adjacent macro-modification action. In the second example embodiment, the adaptive learning circuitry 7 implements a model of the resource-controlled system 1 in which system states resulting from macro-modification actions exist, i.e. resources are varied in predefined increments. The second example embodiment enables to generate updates of the value function as if potentially harmful macro-modification actions had been effected, without actually effecting such macro-modification actions.

One adaptive learning technique that may be employed in example embodiments is reinforcement learning. In such method, the resource management apparatus 5 interacts with the resource-controlled system 1, e.g. cloud computing environment, observes the results of interacting, and adjusts the manner in which subsequent interaction is performed. The interaction may be governed or at least influenced by a decision making function or policy, and the observations made may be referred to as a "scalar reward" or "reinforcement." By adjusting policy and/or interaction, reinforcement learning adapts to changes and/or prevents unpredictable developments in its environment. Reinforcement learning may be useful in embodiments since the strategy(ies) that might be best used in assigning resources to applications may not be clear and/or may change. In embodiments, a policy may take the form of a function, while in other embodiments; a look-up table may be used to represent a policy. Reinforcement learning may be based on one or more value functions and/or one or more reward or return functions. A reward function may define a goal to be achieved and may correlate or map one or more or each state and/or action, such as in a state-action pair, of an environment to a respective number. A reward function may further identify events as beneficial and/or detrimental so that the policy under which the reward function operates may be modified to achieve a more beneficial result for a subsequent action. An immediate desirability of a state may therefore be determined.

A value function may be used to represent what is beneficial over a longer period of time than the reward function. It may be used to estimate a total amount of reward an agent, such as resource management apparatus 5, may accumulate in the future starting from a given system state, which total amount of reward is the value of the given state. A value function may further take into account subsequent states and their estimated rewards as part of the estimation of a value of a given state. In reinforcement learning, states of highest value are typically sought, as opposed to states of highest reward, since states of highest value may yield the greatest amount of reward over time.

"Desirable" or "beneficial" as employed herein refer to one or more objective or subjective qualities of the resource-controlled system, which are explicitly or implicitly reflected in the policies that govern the adaptive learning agent. In example embodiments, desirability of the system may imply one or more qualities selected among energy-efficient, cost-efficient, fast, stable, user-friendly, comfortable, etc.

In an embodiment, the resource management apparatus 5 implements a reinforcement learning method comprising the iterative steps of:
- converting and analyzing the performance metrics 4 received from the monitoring circuitry 3,
- updating the value function of the adaptive learning circuitry 7 which represents a model 9 of the resource-controlled system 1, and
- selecting a resource modification action to be effected under the current condition.

For example, the Reinforcement Learning method may be Q-Learning, which estimates system states and rewards (i.e. reward function values) from the performance metrics 4. Q-Learning uses the states and rewards to update the Q-values $Q(s, a)$, which represent the quality of a resource modification action a for a given system state s. In other words, Q-values are cumulative rewards learned in the adaptive learning circuitry 7. After the update, the adaptive learning circuitry 7 decides the action to take for the current state.

The action generator 10 may select a resource modification action in two ways. The action generator 10 may select an exploitation action 11, i.e. a resource modification action that has the highest quality in the system state s, defined as:

$$a = arg\,max_{a'} Q(s,a')$$

The action generator 10 may select an exploration action 12, e.g. randomly, in order to explore the space of system states.

In an example embodiment, exploitation actions 11 are more frequent than exploration actions 12.

The resource modification action is defined by one or more parameters designating:
- one or more types of the resources to be modified
- a quantitative amount of the modification for the one or more, or each resource type, e.g. a signed resource variation parameter or an unsigned resource variation parameter
- a direction of the modification for the one or more, or each resource type, i.e. whether adding or removing resources is requested, which may be indicated by a sign of the resource variation parameter.

The resource modification action may be initially selected as a macro-modification action, i.e. the resource variation parameters are defined on a range of predefined discrete values, e.g. as a function of predefined resource increments which may be imposed by technical or operational characteristics of the resource-controlled system 1.

The resource modification action 11 or 12 initially selected by the action generator 10 is communicated to the attenuation circuitry 8 which makes the learning process safer by providing the capability of taking modifications of a smaller scale, e.g. micro-modification actions. The attenuation circuitry 8 comprises two functional modules or applications: a stability checker 13 and an Attenuation Manager 14.

In case an exploitation action is selected, the stability checker 13 decides whether the knowledge of such action is safe or trustworthy. In other words, the exploitation action selected by the action generator 10 provides a positive action-value. Stability checker 13 operates to check whether its action-value is trustworthy to ensure this action is safe to take.

If the action is considered safe, the exploitation action is effected without modification. For that purpose, the stability checker 13 sends a control signal 15 to the resource control interface 2. For example, control signal 15 contains the corresponding resource variation parameters or instructions that enable resource control interface 2 to retrieve the corresponding resource variation parameters. Otherwise, the stability checker 13 sends out a control signal 16 to the attenuation manager to trigger attenuation of the modification action.

Here, the safety criterion can rely on statistical principles, e.g. a trustworthiness criterion may depend on the number of times the action a has been executed in the given state s, and how stable the learnt Q-value was along these visits. If the state-action pair (s, a) did not occur frequently, or if the series of Q(s, a) values contain high variance and do not converge over the time, then this can be a sign of lack of safety.

In case an exploration action 12 is selected e.g. randomly irrespective of the Q-values, the random modification-action is directly signaled to the Attenuation Manager 14 to trigger attenuation of the modification action, e.g. to form one or more micro-modification action instead of a macro-modification action.

The attenuation manager 14 may transform the initial modification action into one or more attenuated modification actions by modifying the magnitude of the resource variation parameter or parameters. For example, for a cloud computing system, the micro-modification action to be taken may correspond to 10% of the initial macro-modification action. For example, the macro-modification action comprises removing a Virtual Machine (VM) with 1Go of Random-Access Memory (RAM) and 10 units of virtual Central Processing Unit (vCPU), whereas the micro-modification action will constrain one VM to reduce its RAM capacity by 100 Mo and its processing capacity by 1 vCPU instead.

The direction of the attenuated action is the same as that of the initial modification-action. However, in some cases, the attenuation manager 14 may select multiple micro-modification actions in different directions in order to explore how individual resource modifications affect the resource-controlled system 1. For example, one micro-modification action may act on the RAM capacity and another micro-modification action may act on the vCPU capacity. Modifying resources individually may be suitable to facilitate the extrapolation determination, which will be described below.

The set of parameters that allow formulating an attenuated modification action, e.g. micro-modification action, from the initial modification action in a current system state are stored in Safety Policies module 18. The safety policies provide a set of rules that govern the decisions of the attenuation Manager 14. The safety policies can be defined by using some expert knowledge of system 1, driven by technical considerations or automatically learnt from past experiences. These may include:

Explore safely in the area which contradicts the currently learned exploitation policies, Do not explore by reducing the capacity of a given resource by more than some substantial percentage, e.g. 20% of the current capacity, The safety policies can for example specify risk zones in the system stat space where the attenuation is required. For example, in a data processing system, resource reduction actions should be attenuated in situations with high input charge and low available capacity. Thus, the attenuation magnitude can vary depending on the estimated risk level of the initial modification-action. The safer the macro-modification action, the closer the micro-modification action may be to it. Hence, in the states outside of risk zones, the policies could require no attenuation and the attenuation manager 14 may eventually decide to effect the initial modification action without modification.

After selection or modification of the attenuated modification action, the attenuation manager 14 sends a control signal 17 to the resource control interface 2. The control signal 17 contains a definition of the attenuated modification action for execution by the resource control interface 2. For example, control signal 17 contains the corresponding resource variation parameters or instructions that enable resource control interface 2 to retrieve the corresponding resource variation parameters.

In the second example embodiment depicted in FIG. 4, attenuation manager 14 also sends a control signal 417 to an extrapolation application, circuitry, computer, and/or server 401 to trigger extrapolation determination, which will be described below.

In the second example embodiment, the coarse system model implemented by the adaptive learning circuitry 7 is based on macro-modification actions. The resource management apparatus 5 comprises an extrapolation circuitry 401.

The extrapolation circuitry 401 operates to update the coarse system model implemented by the adaptive learning circuitry 7 (e.g. Q-values) by observing the effects of executed attenuated modification actions, e.g. micro-modification actions.

After issuing an attenuated modification action, the attenuation manager 14 triggers the operations of the extrapolation circuitry 401 with control signal 417, so that the extrapolation circuitry 401 knows which modification action has been executed in the current state. As indicated by arrow 402, the extrapolation circuitry 401 acquires the performance metrics 4 that are monitored by estimation circuitry 6, e.g. continuously monitored.

In the example of Q-Learning, extrapolation circuitry 401 triggers reward extrapolation to find reward in the system state space of the initial macro-modification action. Extrapolation circuitry 401 passes the rewards to estimation circuitry 6 as indicated by arrow 403. The adaptive learning circuitry 7 receives the rewards of the macro-modification actions from estimation circuitry 6 as indicated by arrow 420 and uses this information to update the corresponding Q-values.

Extrapolation circuitry 401 comprises two applications or functional modules: action extrapolator 405 and reward extrapolator 406. The action extrapolator 405 extrapolates the micro-modification action that was executed to find one or two adjacent macro-modification actions whose resource variation parameters are above and/or below the micro-modification action, e.g. the nearest multiples of the pre-defined resource increment.

For instance, in a cloud computing system, the micro-modification action may comprise removing a fraction $\delta(<1)$ of a single VM, i.e. reconfiguring one VM. The action extrapolator 405 finds the adjacent macro-modification actions to be −1 (remove 1 VM) and 0 (no modification).

The reward extrapolator 406 extrapolates the reward function from the value obtained with the micro-modification action to obtain an estimate of the reward function for the two adjacent macro-modification actions.

For instance, in the cloud computing system, the reward associated with the micro-modification action having the resource variation parameter $(-\delta)$ is $(r_{-\delta})$. The reward extrapolator 406 finds the reward function values for the macro-modification actions having the resource variation parameter $(-1)$, i.e. removing one VM and $(0)$, i.e. no modification.

One extrapolation method which may be implemented by reward extrapolator 406 is linear extrapolation. In that method, a difference d between Q-values $d=Q(s, 0)-Q(s,-1)$ is computed firstly, where s denotes the system state at which the micro-modification action was taken. The discounted difference $(1-\gamma)d$ is used as the slope for extrapolating the reward function. The reward value for the macro-modification action having the resource variation parameter $(-1)$ is $$r_{-\delta}-(1-\gamma)d\cdot(1-\delta).$$

The reward value for the macro-modification action having the resource variation parameter (0) is:

$$r_{-\delta}+(1-\gamma)d\cdot\delta.$$

When the Extrapolation circuitry 401 finishes, it sends a signal 418 to the resource control interface 2 to reverse the micro-modification action that was taken.

Figure 5:
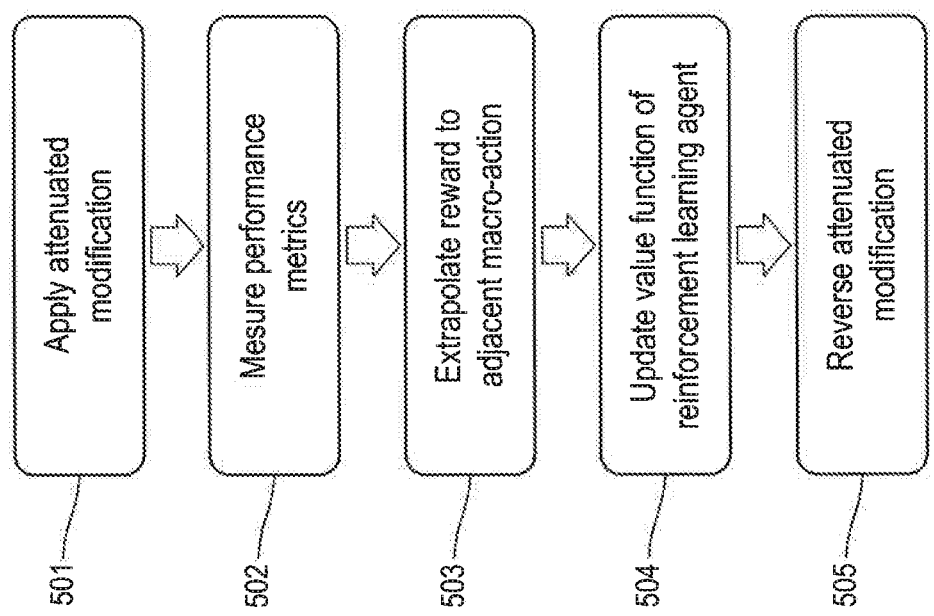
FIG. 5 is a flow chart of an iterative process that may be executed by the resource management apparatus of FIG. 4 in accordance with another example embodiment.

FIG. 5 is a flow chart of an iterative method that may be implemented by the resource management apparatus 5 in the second embodiment. It comprises the steps of:

501: Applying a resource modification by effecting an attenuated modification action

502: measuring performance metrics to determine a condition of the resource-controlled system 1 after the resource modification

503: extrapolating reward from the value for the attenuated modification action to a value for an adjacent macro-modification action

504: updating the value function (Q-values) of the adaptive (reinforcement) learning circuitry 7 for the adjacent macro-modification action

505: reversing the attenuated modification action

Hence, in the second example embodiment, the system states resulting from the attenuated actions are not recorded as such in the coarse model implemented by the adaptive learning circuitry 7. Attenuated actions are temporary resource variations that are reversed and the adaptive learning circuitry 7 records system states that result from macro-modification actions.

As an extension of the above method, the micro-modification actions can be executed in series of increasing magnitude, at successive iterations of the method, until a desired extrapolation accuracy is achieved.

The attenuation manager 14 may operate to transform a macro-modification action into one or more micro-modification actions. In the second example embodiment the extrapolation circuitry 401 operates to learn the rewards corresponding to the macro-modification action by extrapolation without directly visiting the potentially undesirable system states that would result from actually effecting the macro-modification action. In other words, attenuation manager 14 may select a small amplitude modification action in the direction of an unsafe state which would have resulted from effecting the modification action initially selected by the action generator 10. The extrapolation circuitry 401 operates to predict the quality of the initial modification action, i.e. to learn the potentially low rewards without effecting it.

In an example embodiment, the resource-controlled system 1 may be a virtualized data processing system such as a cloud computing system. Such system may be made available to end-users by a cloud provider for a fee-for-service. Macro-modification actions may be defined by the cloud provider as a predefined granularity of resources that can be rented for a given application. As an example, a cloud provider allows to scale up or down the cloud computing system rented by the end-user by using a predefined image of VM as a resource granularity.

In an example embodiment, the performance metrics include the CPU usage of the VMs, the usage of RAM, the usage of hard drives, etc.

For executing the micro-modification actions on such virtualized data processing system, the resource management apparatus 5 may rely on specific functions or low-level APIs provided by the virtualized data processing system which allow the execution of small capacity changes. For example, in the case of a cloud infrastructure based an open-source solution called Openstack, a virtualization library libvirt or other Linux system level interfaces can be used as the resource control interface 2 for executing small capacity limitations on the computing resources such as RAM, vCPU, disk I/O and network bandwidth.

The way a micro-modification action is executed can depend on its magnitude. For example, if the virtualized data processing system has a few virtual machines, a micro-modification action may comprise reducing the capacity of one of them, e.g. reduce the vCPU of one virtual machine by some percentage. In this case, the resource control interface 2 will act on a single virtual machine to emulate capacity reduction. Capacity reduction may be emulated by launching a noisy process that consumes a controlled amount of vCPU on one or more VMs. However, if the virtualized data processing system has a large number of virtual machines, a micro-modification action may comprise disabling several VMs, e.g. suspend a given percentage of the virtual machines.

In an embodiment, the resource control interface 2 may include two controllers: a micro-modification action controller 29 for effecting micro-modification actions and a macro-modification action controller 28 for effecting macro-modification actions.

While example embodiments of the invention have been described in relation to a data processing system, the resource-controlled system is not limited to a data processing system and may be an industrial system or a business organization in which causal control is exerted over the resources consumed by the system. In an embodiment, the resource-controlled system comprises a team of human workers and/or a pool of machines and the system states are defined by a number of human workers and/or a machines that are active at a given instant in time, e.g. among a team of cashiers in a supermarket or a team of operators in a call-center.

The resource control interface 2 may be a resource control circuitry, e.g. web-based interface of a cloud computing service or a computerized planning system of a business organization. Alternatively, the resource control interface 2 may be a resource control application, computer, and/or server. Alternatively and additionally, the resource control interface 2 may be a human organization (e.g. a team manager). Accordingly, the control signals 15 or 17 carrying resource modification instructions to resource control interface 2 may be provide in a computer-readable format or in a human-readable format.

As used in this application, the term "circuitry" may refer to one or more or all of the following:

(a) hardware-only circuit implementations (such as implementations in only analog and/or digital circuitry) and (b) combinations of hardware circuits and software, such as (as applicable):

(i) a combination of analog and/or digital hardware circuit(s) with software/firmware and (ii) any portions of hardware processor(s) with software (including digital signal processor(s)), software, and memory(ies) that work together to cause an apparatus, such as a mobile phone or server, to perform various functions) and (c) hardware circuit(s) and or processor(s), such as a microprocessor(s) or a portion of a microprocessor(s), that requires software (e.g., firmware) for operation, but the software may not be present when it is not needed for operation."

This definition of circuitry applies to all uses of this term in this application, including in any claims. As a further example, as used in this application, the term circuitry also covers an implementation of merely a hardware circuit or processor (or multiple processors) or portion of a hardware circuit or processor and its (or their) accompanying software and/or firmware. The term circuitry also covers, for example and if applicable to the particular claim element, a baseband integrated circuit or processor integrated circuit for a mobile device or a similar integrated circuit in server, a cellular network device, or other computing or network device.

Elements such as the resource management apparatus 5 and its components could be or include e.g. hardware means like e.g. an Application-Specific Integrated Circuit (ASIC), or a combination of hardware and software means, e.g. an ASIC and a Field-Programmable Gate Array (FPGA), or at least one microprocessor and at least one memory with software modules located therein, e.g. a programmed computer.

Figure 6:
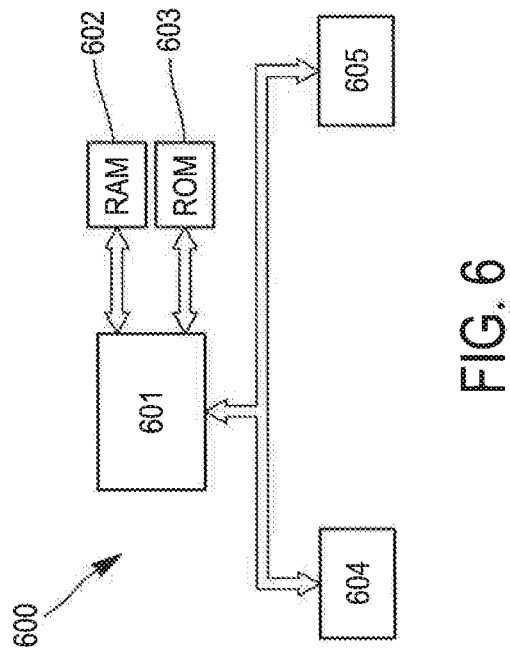
FIG. 6 is a functional diagram of a programmed computer in which example embodiments of the invention may be implemented.

FIG. 6 shows a functional diagram of a programmed computer, server, circuitry, or apparatus 600 that may be used for that purpose. Computer 600 has a core and several peripherals connected via a communication bus. The major components of the core are a microprocessor 601 (often called the CPU) random access memory (RAM) 602 and read only memory (ROM) 603. The peripherals comprise devices that allow information to be input to the system from users, output to users and stored and retrieved (mass storage devices 604 such as hard disks and network interfaces 605).

The invention is not limited to the described example embodiments. The appended claims are to be construed as embodying all modifications and alternative constructions that may occur to one skilled in the art, and which fairly fall within the basic teaching as set forth herein.

The use of the verb "to comprise" or "to include" and its conjugations does not exclude the presence of elements or steps other than those stated in a claim. Furthermore, the use of the article "a" or "an" preceding an element or step does not exclude the presence of a plurality of such elements or steps. The example embodiments may be implemented by means of hardware as well as software. The same item of hardware may represent several "means".

In the claims, any reference signs placed between parentheses shall not be construed as limiting the scope of the claims.

The invention claimed is:

1. An apparatus comprising:
   at least one processor; and
   at least one memory including computer program code,
   the at least one memory and the computer program code configured to, with the at least one processor, cause the apparatus at least:
      select a modification action having at least one resource variation parameter, wherein the resource variation parameter represents a resource quantity to be added or removed in a resource-controlled system;
      update a value function of an adaptive learning agent as a function of one or more performance metrics measured after resources of the resource-controlled system have been modified by effecting the modification action, wherein the one or more performance metrics relate to the resource-controlled system, wherein the value function represents a desirability of the resource-controlled system as a function of one or more system states;
      wherein selecting the modification action further causes the apparatus to at least:
         select a first resource variation parameter, and
         assess whether the modification action having the first resource variation parameter fulfills at least one safety criterion, and
         substitute the first resource variation parameter by a second resource variation parameter having a finer scale resource quantity than the first resource variation parameter responsive to the safety criterion not being fulfilled;
      modify the resources of the resource-controlled system by effecting the modification action prior to updating the value function of the adaptive learning agent;
      determine a macro-modification action adjacent to the modification action by at least rounding the second resource variation parameter to an integer multiple of a predefined resource increment, wherein the value function is defined for the one or more system states resulting from one or more macro-modification actions, wherein the macro-modification action includes at least one resource variation parameter equal to the integer multiple of the predefined resource increment, and wherein the value function is updated for a system state which would have resulted from the macro-modification action adjacent to the modification action; and
      reverse the modification action to further modify the resources of the resource-controlled system.

2. The apparatus of claim 1, further configured to at least perform:
   determine a reward function value for the modification action as a function of the performance metrics measured after the resources of the resource-controlled system have been modified by effecting the modification action; wherein the
   reward function value for the macro-modification action is determined by at least extrapolating a reward function.

3. The apparatus of claim 2, wherein the reward function is linearly extrapolated.

4. The apparatus of claim 1, further configured to at least compare a variance of the value function to a predefined threshold value to assess whether the safety criterion is fulfilled.

5. The apparatus of claim 1, further configured to at least compare the resource variation parameter to a predefined threshold value to assess whether the safety criterion is fulfilled.

6. The method of claim 1, further configured to at least:
   determine a number of prior occurrences of the modification action to assess whether the safety criterion is fulfilled.

7. The apparatus of claim 1, wherein the first resource variation parameter is randomly selected.

8. The apparatus of claim 1, wherein the first resource variation parameter is selected to maximize the value function in a current system state.

9. The apparatus of claim 1, wherein selecting the modification action further comprises selecting a resource type in a set of resource types.

10. The apparatus of claim 1, wherein the resource-controlled system comprises a data processing system, wherein the at least one resource variation parameter relates to a resource selected in the group comprising:
    random access memory capacity, central processing unit processing power, central processing unit bandwidth, number of processor-cores, number of virtual machines, disk input/output bandwidth and network input/output bandwidth.

11. The apparatus of claim 10, further configured to at least
    send one or more resource modification instructions to a virtualization layer of the data processing system to effect the modification action.

12. A method comprising:
    selecting a modification action having at least one resource variation parameter, wherein the resource variation parameter represents a resource quantity to be added or removed in the resource-controlled system;

updating a value function of an adaptive learning agent as a function of one or more performance metrics measured after the resources of the resource-controlled system have been modified by effecting the modification action, wherein the one or more performance metrics relate to the resource-controlled system, wherein the value function represents a desirability of the resource-controlled system as a function of one or more system states;

wherein selecting the modification action further comprises:
  selecting a first resource variation parameter, and
  assessing whether the modification action having the first resource variation parameter fulfills at least one safety criterion, and
  substituting the first resource variation parameter by a second resource variation parameter having a finer scale resource quantity than the first resource variation parameter responsive to the safety criterion not being fulfilled;
modifying the resources of the resource-controlled system by effecting the modification action prior to updating the value function of the adaptive learning agent;
determining a macro-modification action adjacent to the modification action by at least rounding the second resource variation parameter to an integer multiple of a predefined resource increment, wherein the value function is defined for the one or more system states resulting from one or more macro-modification actions, wherein the macro-modification action includes at least one resource variation parameter equal to the integer multiple of the predefined resource increment, and wherein the value function is updated for a system state which would have resulted from the macro-modification action adjacent to the modification action; and
reversing the modification action to further modify the resources of the resource-controlled system.

13. The method of claim 12, further comprising:
comparing a variance of the value function to a predefined threshold value to assess whether the safety criterion is fulfilled.

14. The method of claim 12, further comprising:
comparing the resource variation parameter to a predefined threshold value to assess whether the safety criterion is fulfilled.

15. The method of claim 12, further comprising:
determining a number of prior occurrences of the modification action to assess whether the safety criterion is fulfilled.

16. The method of claim 12, wherein the first resource variation parameter is selected to maximize the value function in a current system state.

17. A non-transitory computer program comprising executable code for causing an apparatus to perform at least the following:
  selecting a modification action having at least one resource variation parameter, wherein the resource variation parameter represents a resource quantity to be added or removed in a resource-controlled system;
  updating a value function of an adaptive learning agent as a function of one or more performance metrics measured after the resources of the resource-controlled system have been modified by effecting the modification action, wherein the one or more performance metrics relate to the resource-controlled system, wherein the value function represents a desirability of the resource-controlled system as a function of one or more system states;
  wherein selecting the modification action further comprises:
    selecting a first resource variation parameter, and
    assessing whether the modification action having the first resource variation parameter fulfills at least one safety criterion, and
    substituting the first resource variation parameter by a second resource variation parameter having a finer scale resource quantity than the first resource variation parameter responsive to the safety criterion not being fulfilled;
  modifying the resources of the resource-controlled system by effecting the modification action prior to updating the value function of the adaptive learning agent;
  determining a macro-modification action adjacent to the modification action by at least rounding the second resource variation parameter to an integer multiple of a predefined resource increment, wherein the value function is defined for the one or more system states resulting from one or more macro-modification actions, wherein the macro-modification action includes at least one resource variation parameter equal to the integer multiple of the predefined resource increment, and wherein the value function is updated for a system state which would have resulted from the macro-modification action adjacent to the modification action; and
  reversing the modification action to further modify the resources of the resource-controlled system by reversing the modification action.

* * * * *